(12) United States Patent
Wei et al.

(10) Patent No.: US 11,805,116 B2
(45) Date of Patent: Oct. 31, 2023

(54) TECHNOLOGIES FOR SECURING NETWORK FUNCTION VIRTUALIZATION IMAGES

(71) Applicant: INTEL CORPORATION, Santa Clara, CA (US)

(72) Inventors: Changzheng Wei, Shanghai (CN); Weigang Li, Shanghai (CN); Danny Y. Zhou, Shanghai (CN); Junyuan Wang, Shanghai (CN); Hari K. Tadepalli, Gilbert, AZ (US); Rashmin N. Patel, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 16/957,628

(22) PCT Filed: Mar. 31, 2018

(86) PCT No.: PCT/CN2018/081485
§ 371 (c)(1),
(2) Date: Jun. 24, 2020

(87) PCT Pub. No.: WO2019/183980
PCT Pub. Date: Oct. 3, 2019

(65) Prior Publication Data
US 2021/0014217 A1    Jan. 14, 2021

(51) Int. Cl.
*H04W 12/04*    (2021.01)
*H04W 12/06*    (2021.01)
(Continued)

(52) U.S. Cl.
CPC ........ *H04L 63/0823* (2013.01); *H04L 9/3242* (2013.01); *H04L 63/12* (2013.01); *H04W 12/009* (2019.01); *H04L 2463/062* (2013.01)

(58) Field of Classification Search
CPC ... H04L 63/0823; H04L 9/3242; H04L 63/12; H04L 2463/062; H04L 41/0806; H04W 12/009
See application file for complete search history.

(56) References Cited

U.S. PATENT DOCUMENTS 9,953,168 B1 *   4/2018   Lango ................... H04L 9/3268
2013/0276136 A1   10/2013  Goodwin et al.
(Continued)

FOREIGN PATENT DOCUMENTS

WO    WO-2017074461 A1 *   5/2017   ......... G06F 9/45558

OTHER PUBLICATIONS

Igor D. Alvarenga; Gabriel A. F. Rebello; Otto Carlos M. B. Duarte; "Securing Configuration Management and Migration of Virtual Network Functions Using Blockchain"; NOMS 2018—2018 IEEE/IFIP Network Operations and Management Symposium; May 2018 | Conference Paper | Publisher: IEEE; pp. 1-9 (Year: 2018).*
(Continued)

*Primary Examiner* — Shewaye Gelagay
*Assistant Examiner* — Courtney D Fields
(74) *Attorney, Agent, or Firm* — Compass IP Law PC

(57) ABSTRACT

Technologies for securing a virtualization network function (VNF) image includes a security server to generate a wrapping cryptographic key to wrap a private key of the VNF image and replace the private key with the wrapped private key to secure the private key. During operation, the VNF image may be authenticated by a network function virtualization (NFV) server as needed. Additionally, the signature of the VNF image may be updated each time the VNF image is shutdown to ensure the continued authenticity of the VNF image.

10 Claims, 9 Drawing Sheets

(51) Int. Cl.
*H04L 9/40* (2022.01)
*H04W 12/00* (2021.01)
*H04L 9/32* (2006.01)
*G06F 21/72* (2013.01)

(56) References Cited

U.S. PATENT DOCUMENTS

| | | | | |
|---|---|---|---|---|
| 2016/0065567 | A1* | 3/2016 | Aggarwal | H04L 63/062 |
| | | | | 713/175 |
| 2016/0337329 | A1* | 11/2016 | Sood | H04L 63/06 |
| 2016/0353226 | A1* | 12/2016 | Rao | H04L 41/40 |
| 2016/0373474 | A1* | 12/2016 | Sood | G06F 21/50 |

OTHER PUBLICATIONS

PCT Search Report and Written Opinion prepared for PCT/CN2018/081485, completed Dec. 3, 2019.

* cited by examiner

TECHNOLOGIES FOR SECURING NETWORK FUNCTION VIRTUALIZATION IMAGES

CROSS REFERENCE TO RELATED APPLICATIONS

The present application is a national stage entry under 35 USC § 371(b) of International Application No. PCT/CN2018/081485, filed Mar. 31, 2018.

BACKGROUND

Network operators and service providers typically rely on various network virtualization technologies to manage complex, large-scale computing environments, such as high-performance computing (HPC) and cloud computing environments. For example, network operators and service provider networks may rely on network function virtualization (NFV) deployments to deploy network services (e.g., firewall services, network address translation (NAT) services, load-balancing services, deep packet inspection (DPI) services, transmission control protocol (TCP) optimization services, etc.). Such NFV deployments typically use an NFV infrastructure to orchestrate various virtual machines (VMs) to perform virtualized network services, commonly referred to as virtualized network functions (VNFs), on network traffic and to manage the network traffic across the various VMs.

Unlike traditional, non-virtualized deployments, virtualized deployments decouple network functions from underlying hardware, which results in network functions and services that are highly dynamic and generally capable of being executed on off-the-shelf servers with general purpose processors. As such, a single physical server may host multiple instances of a VNF image or images to perform various virtualized network functions. In typical systems, each VNF image is authenticated by the host server only at the time of deployment. If the VNF image is authenticated, the VNF image may be used repeatedly for establishing and tearing down VNF instances. However, such security measures can be susceptible to different types of attacks on the VNF image, especially by those directed toward the private key of the VNF image. For example, the VNF image may be altered or tampered with during shutdown/restart and/or hibernate/wakeup. Additionally, a malicious VNF instance may attempt to steal the private key of other valid VNF images. A hypervisor hosting a VNF image on the host server may become compromised and attempt to access the private key of the VNF image. Furthermore, other malicious code may attempt to snoop the host memory to retrieve the private key of the VNF image.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
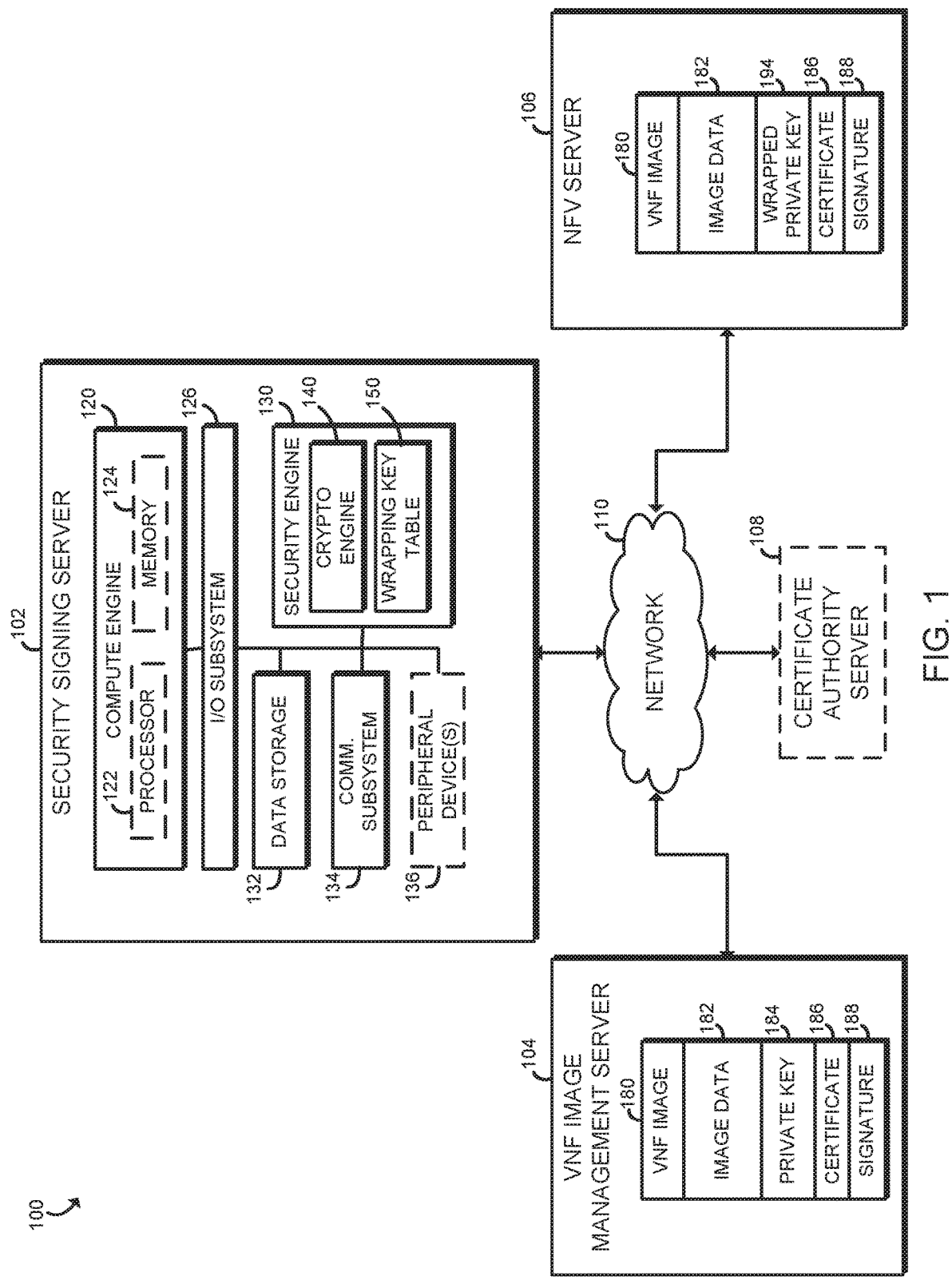
FIG. 1 is a simplified block diagram of at least one embodiment of a system for securing virtualization network function (VNF) images.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for securing virtualization network function (VNF) images includes a security signing server 102, a VNF image management server 104, a network function virtualization (NFV) server 106, and, in some embodiments, a certificate authority server 108. Each of the security signing server 102, the VNF image management server 104, the NFV server 106, and the certificate authority server 108 communicate with each other over a network 110. Although only a single VNF image management server 104 and a single NFV server 106 is shown in FIG. 1, it should be appreciated that the system 100 may include multiple VNF image management servers 104 and/or multiple NFV servers 106 in other embodiments.

During operation of the system 100, the VNF image management server 104 develops and manages VNF images 180 for deployment on the NFV server 106. Although only one VNF image 180 is shown as managed by the VNF image management server 104 in FIG. 1, it should be appreciated that the VNF image management server 104 may develop and manage multiple VNF images 180, which may be similar or different from each other. Each VNF image includes VNF image data 182, a private key 184, a certificate 186, and a signature 188. The VNF image data 182 may be embodied as any type of VNF image executable by the NFV server 106 to establish an instance of a virtualized network function, which may perform any suitable network service. For example, the VNF image 180, when executed by the NFV server 106, may provide firewall services, network address translation (NAT) services, load-balancing services, deep packet inspection (DPI) services, transmission control protocol (TCP) optimization services, and/or other network service or function.

The private key 184 included in the VNF image 180 may be embodied as any type of cryptographic key. In the illustrative embodiment, the private key 184 is generated by the VNF image management server 104 and appended to the VNF image 180. However, in other embodiments, the private key 184 may be generated by another component or server of the system 100 and provided to the VNF image management server 104. In use, the private key 184 is usable by the VNF image management server 104 (and other devices of the system 100 as described below) to sign a hash of the image data 182 to generate the signature 188, which authenticates the VNF image 180. Any suitable cryptographic operation may be used with the private key 184 to generate the signature 188. For example, the private key 184 may be used to encrypt the hash of the image data 182 to generate the signature 188. In such embodiments, the signature 188 is embodied as an encrypted hash of the image data 182. However, in other embodiments, the private key 184 may be used with other cryptographic operations to generate the signature 188. For example, the private key 184 may be used on the hash of the image data 182 to generate an authentication code usable to authenticate the VNF image 180. In such embodiments, the image data 182 may or may not be encrypted.

In some embodiments, the VNF image 180 may also include the certificate 186. The certificate 186 is generated by the certificate authority server 108 and certifies ownership of a public key, corresponding to the private key 184, included in the certificate 186. The public key is usable by other components of the system 100 to decrypt or otherwise authenticate the signature 188. That is, by decrypting or authenticating the signature 188, other components of the system 100 (e.g., the security signing server 102 and/or the NFV server 106) can confirm that corresponding VNF image 180 was generated by the VNF image management server 104 (or other component of the system 100 having access to the private key 184).

In typical NFV environments, a VNF image is authenticated only at the time of deployment by the managing VNF image management server. As such, typical VNF images can be compromised after deployment and may be especially susceptible to attacks directed to the private key 184. Conversely, the system 100 maintains security and authentication of the VNF images 180 throughout their deployment lifetime. Specifically, as discussed in more detail below, a root of trust is established for each VNF image 180 in which the corresponding private key is maintained in a secure manner Additionally, each time the VNF image 180 is shut down, the present version or content of that VNF image 180 is authenticated and protected. Furthermore, each time the VNF image 180 is "spun up" or otherwise executed, the VNF image 180 is again authenticated. In this way, the system 100 secures the VNF image 180 and, in particular its private key 184, throughout its deployment lifetime.

Figure 2:
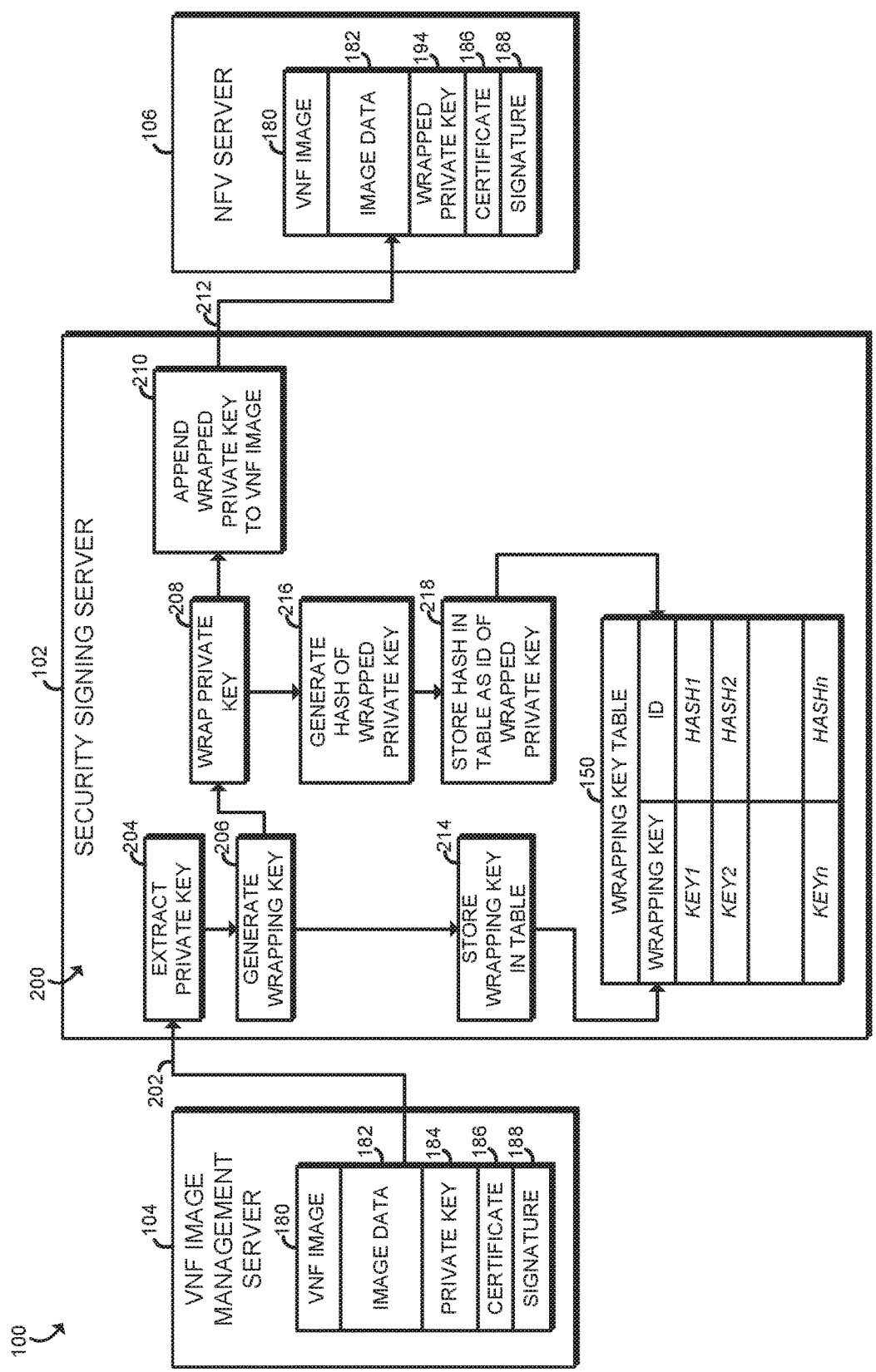
FIG. 2 is a simplified block diagram of at least one embodiment of a process for establishing a root of trust for a VNF image that may be executed by the system of FIG. 1.

For example, as shown in FIG. 2 and discussed in more detail below in regard to the method 700 of FIG. 7, the system 100 may perform a process 200 to establish a root of trust for each VNF image 180 prior to deployment of the VNF images 180 to the corresponding NFV server 106. The process 200 begins with communication 202 in which the VNF image management server 104 provides a VNF image 180 to be secured to the security signing server 102. The VNF image 180 is received by the security signing server 102, which subsequently extracts the private key 184 from the VNF image 180 in block 204 and generates a wrapping key in block 206. As discussed in more detail below, the wrapping key may be embodied as any type of cryptographic key capable of wrapping, encapsulating, or otherwise encrypting the private key 184. As such, in block 208, the security signing server 102 wraps, or encrypts, the private key 184 using the wrapping key to generate a wrapped private key 194, which is a protected version of the private key 184. The security signing server 102 subsequently appends the wrapped private key 194 to the VNF image 180 (e.g., by replacing the unwrapped private key 184 with the wrapped private key 194) and transmits the secured VNF image 180 to the NFV server 106 in communication 212. In this way, the private key 184 is protected and not transmitted "in the clear."

Referring back to block 206, after the security signing server 102 generates the wrapping key, the security signing server 102 stores the wrapping key in a wrapping key table 150 in block 214. Additionally, after the security signing server 102 wraps the private key 184 with the wrapping key in block 208, the security signing server 102 generates a hash of the wrapped private key 194 in block 216. To do so, as discussed below, the security signing server 102 may utilize any suitable hashing algorithm as discussed below. After the security signing server 102 generates the hash of the wrapped private key 194, the security signing server 102 stores the hash of the wrapped private key 194 in the wrapping key table 150 as the identifier (ID) of the corresponding wrapping key generated in block 206 and stored in the wrapping key table 150 in block 214. As discussed in more detail below, the wrapping key table 150 is maintained by the security signing server 102 and correlates wrapping keys to identifiers of wrapped private keys 194 to facilitate the unwrapping thereof. Access to the unwrapped private key 184 allows the security signing server 102 to sign subsequent versions of the VNF image 180 using the wrapped private key 194 as discussed below.

Figure 3:
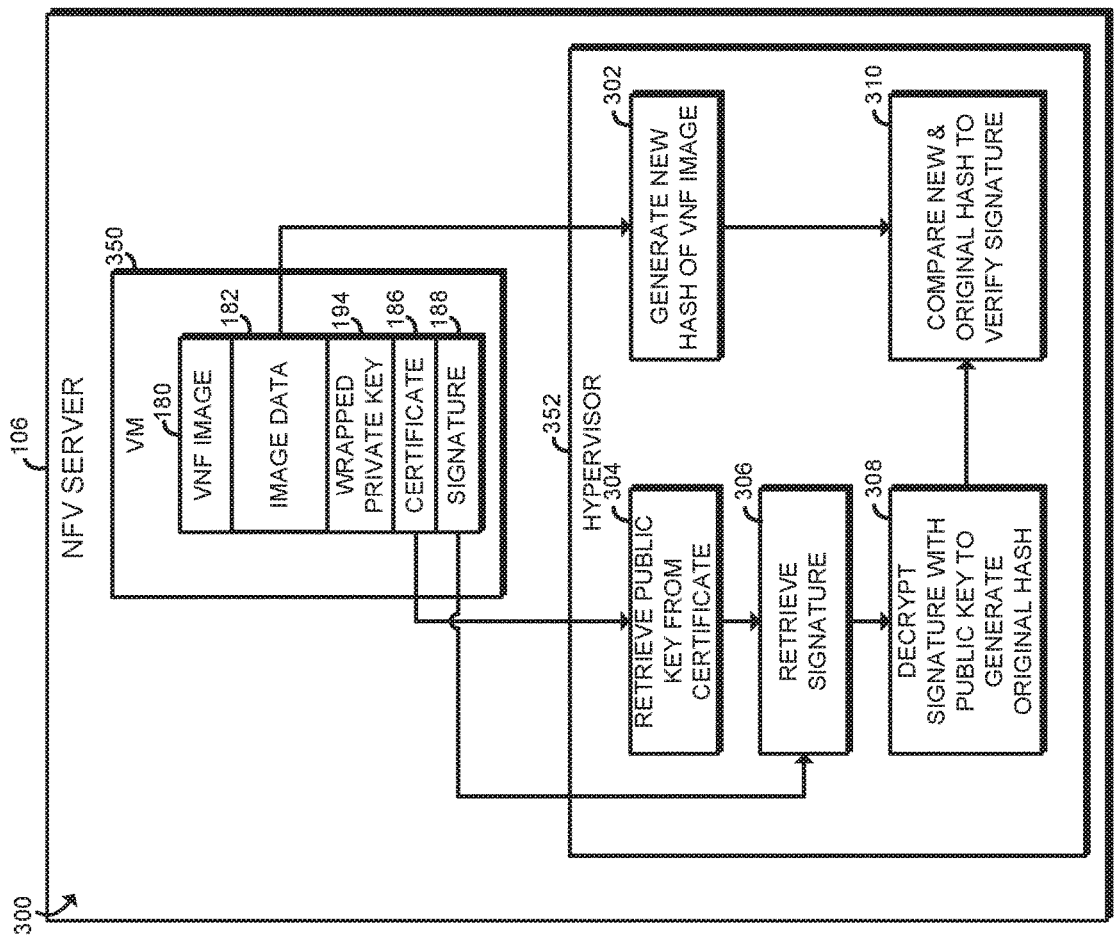
FIG. 3 is a simplified block diagram of at least one embodiment of a process for updating a signature of a VNF image that may be executed by the system of FIG. 1.

Referring now to FIG. 3, in use, the NFV server 106 is configured to authenticate each VNF image 180 prior to spinning up the corresponding VNF image 180. As discussed above, the NFV server 106 may deploy one or more VNF images 180 to perform various network services and functions. In the illustrative embodiment, each VNF image 180 is executed in a corresponding virtual machine 350, which is created and managed by a hypervisor 352 or other virtual machine monitor. As such, only a single VNF image 180 is shown in FIG. 3, it should be appreciated that the hypervisor 352 may deploy multiple VNF images 180, which may perform different or the same network services, in the same or different virtual machines 350 in other embodiments.

When the NFV server 106 initially deploys or spins-up a VNF image 180, the NFV server 106 may perform a process 300 to authenticate that particular VNF image 180. The process 300 begins with block 302 in which the NFV server 106 generates a new hash of the VNF image 180 (e.g., of the image data 182) prior to spinning up that VNF image 180. Additionally, the NFV server 106 retrieves the public key from the certificate 186 of the VNF image 180 in block 304 and the signature of the VNF image 180 in block 306. Subsequently, in block 308, the NFV server 106 decrypts the signature using the public key to generate the original hash of the VNF image 180. In block 310, the NFV server 106 compares the new hash of the VNF image 180 generated in block 302 to the original hash obtained in block 308. If those two hashes match, the NFV server 106 determines that the VNF image 180 is authenticated and spins up the VNF image 180. If those two hashes do not match, the NFV server 106 may determine that the VNF image 180 has been compromised and may take appropriate security measures thereafter.

Figure 4:
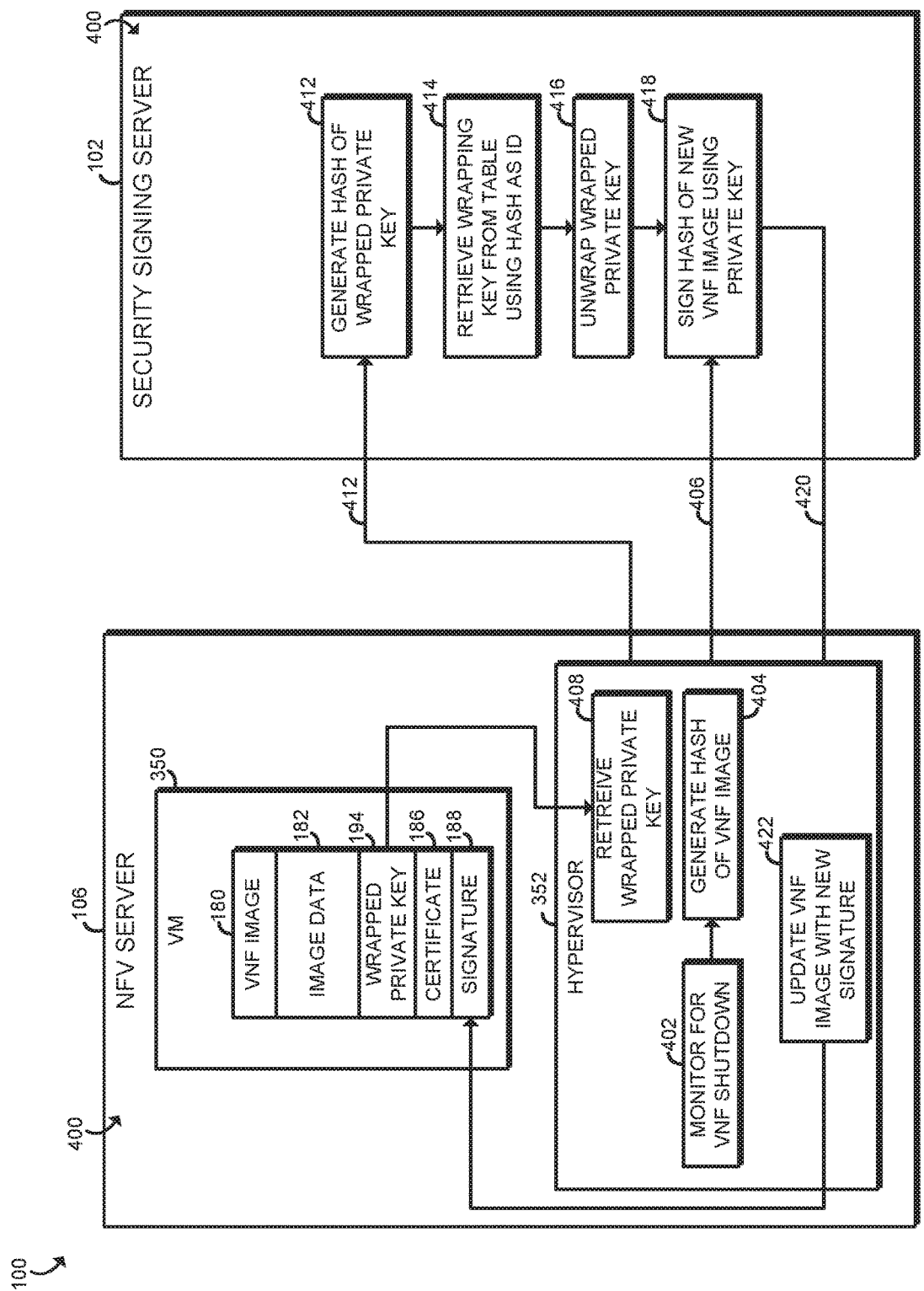
FIG. 4 is a simplified block diagram of at least one embodiment of a process for authenticating a VNF image that may be executed by a VNF server of the system of FIG. 1.

Referring now to FIG. 4, in use, the system 100 is also configured to ensure present versions of the VNF image 180, which may include additional or different content or context data generated during operation, are authenticated at every shutdown of the VNF image 180. To do so, as discussed in more detail below in regard to methods 900 and 1000 of FIGS. 9 and 10, the system 100 may perform a process 400 to update the signature of the VNF image 180 being shutdown. The process 400 begins with block 402 in which a hypervisor 352 of the NFV server 106, which is hosting the VNF image 180, monitors for shutdown of the VNF image 180. If the VNF image 180 is being shutdown, the hypervisor 352 generates a hash of the present VNF image 180 in block 404, which may have additional or different content or context data relative to the VNF image 180 when last deployed or spun up. The hash of the current VNF image 180 is subsequently transmitted to the security signing server 102 in communication 406. In block 308, the hypervisor 352 also retrieves the wrapped private key from the VNF image 180 and transmits the wrapped private key 194 to the security signing server 102 in communication 410.

In block 412, the security signing server 102 generates a hash of the wrapped private key 194 received from the hypervisor in communication 410 and retrieves the wrapping key used to generate the wrapped private key 194 in block 414. To do so, as discussed in more detail below, the security signing server 102 retrieves the wrapping key from the wrapping key table 150 using the hash of the wrapped private key as the identifier for the wrapping key. As discussed above, the wrapping key table 150 correlates wrapping keys to identifiers of wrapped private keys 194. Subsequently, in block 416, the security signing server 102 unwraps the wrapped private key 194 using the wrapping key retrieved in block 414 to obtain the unwrapped private key 184. In block 418, the security signing server 102 signs the hash of the present version of the VNF image 180, which was generated by the hypervisor 352 in block 404, using the unwrapped private key 184. The security signing server 102 subsequently transmits the signed hash of the present VNF image 180 to the NFV server 106 in communication 420, and the NFV server 106 updates the VNF image with the new signature in block 422. In this way, present versions of VNF images 180 may be authenticated and signed at every shutdown, which ensures the authenticity of the VNF image 180 at the next spin-up of the VNF image 180.

Referring back to FIG. 1, the security signing server 102 may be embodied as any type of compute device capable of communicating with the VNF image management server 104 and the NFV server 106 and performing the functions described herein. For example, the security signing server 102 may be embodied as a compute device, a server (e.g., stand-alone, rack-mounted, blade, etc.), a sled (e.g., a compute sled), a workstation, a desktop computer, a laptop computer, a notebook computer, a tablet computer, a mobile computing device, a wearable computing device, a network appliance (e.g., physical or virtual), a router, a web appliance, a distributed computing system, a processor-based system, a multiprocessor system, and/or other computational device. The illustrative security signing server 102 includes a compute engine 120, an I/O subsystem 126, a security engine 130, one or more data storage devices 132, a communication subsystem 134, and, in some embodiments, one or more peripheral devices 136. It should be appreciated that the security signing server 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 120 may be embodied as any type of device or collection of devices capable of performing the various compute functions described herein. In some embodiments, the compute engine 120 may be embodied as a single device, such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 120 may include, or may be embodied as, one or more processors 122 (i.e., one or more central processing units (CPUs)) and memory 124.

The processor(s) 122 may be embodied as any type of processor capable of performing the functions described herein. For example, the processor(s) 122 may be embodied as one or more single-core processors, one or more multi-core processors, a digital signal processor, a microcontroller, or other processor or processing/controlling circuit(s). In some embodiments, the processor(s) 122 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

The memory 124 may be embodied as any type of volatile (e.g., dynamic random access memory (DRAM), etc.) or non-volatile memory or data storage capable of performing the functions described herein. It should be appreciated that the memory 124 may include main memory (i.e., a primary memory) and/or cache memory (i.e., memory that can be accessed more quickly than the main memory). Volatile memory may be embodied as any storage medium that requires power to maintain the state of data stored by the medium. Non-limiting examples of volatile memory may include various types of random access memory (RAM), such as dynamic random access memory (DRAM) or static random access memory (SRAM).

The compute engine 120 is communicatively coupled to other components of the security signing server 102 via the I/O subsystem 126, which may be embodied as circuitry and/or components to facilitate input/output operations with the processor 122, the memory 124, and other components of the a manageability engine, an out-of-band processor, a Trusted Platform Module (TPM), or other security engine device or collection of devices. For example, the I/O subsystem 126 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 126 may form a portion of a system-on-a-chip (SoC) and be incorporated, along with the compute engine 120 (e.g., the processor 122, the memory 124, etc.) and/or other components of the security signing server 102, on a single integrated circuit chip.

The security engine 130 may be embodied as may be embodied as any hardware component(s) or circuitry capable of providing security-related services to the security signing server 102. For example, the security engine may be embodied as a security co-processor, microcontroller, or other embedded controller capable of executing firmware and/or other code (e.g., cryptographic functions) independently and securely from the compute engine 120. In some embodiments, the security engine 130 may be embodied as a converged security and manageability engine (CSME), a manageability engine, an out-of-band processor, a Trusted Platform Module (TPM), or other security engine device or collection of devices. The security engine 130 includes a cryptographic engine 140 configured to provide cryptographic services. The cryptographic engine 140 may be embodied as any type of hardware, firmware, and/or software capable of encrypting and decrypting data (e.g., the VNF image data 182 and private key 184) in a secured environment.

The security engine 130 stores and maintains the wrapping key table 150. For example, in the illustrative embodiment, the security engine 130 stores the wrapping key table 150 in a secured memory location of the security engine 130 that is only accessible by the security engine 130 (or in a secured memory location of the memory 124 that is accessible only by the security engine 130). The wrapping key table 150 may be embodied as any type of data structure, such as a database, flat file, or the like, capable of correlating the generated wrapping keys with the hash of the corresponding wrapped private key 194, which is used as the identifier for the corresponding wrapping key as discussed above. In this way, the security signing server 102 may access the correlated wrapping key for a particular wrapped private key 194 by determining the hash of that particular wrapped private key 194 and using that hash as an identifier lookup on the wrapping key table 150.

The one or more data storage devices 132 may be embodied as any type of storage device(s) configured for short-term or long-term storage of data, such as, for example, memory devices and circuits, memory cards, hard disk drives, solid-state drives, or other data storage devices. In some embodiments, the data storage devices 132 may store various data to facilitate the operation of the security signing server 102 such an operating system, firmware code, and other data.

The communication circuitry 134 may be embodied as any communication circuit, device, or collection thereof, capable of enabling communications between the security signing server 102 and other computing devices of the system 100, such as the VNF image management server 104, the NFV server 106, and the certificate authority server 108. Accordingly, the communication circuitry 134 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication. Furthermore, it should be appreciated that, in some embodiments, the communication circuitry 134 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the security signing server 102, etc.), performing computational functions, etc.

The one or more peripheral devices 136 may include any type of device that is usable to input information into the security signing server 102 and/or receive information from the security signing server 102. The peripheral devices 136 may be embodied as any auxiliary device usable to input information into the security signing server 102, such as a keyboard, a mouse, a microphone, a barcode reader, an image scanner, etc., or output information from the security signing server 102, such as a display, a speaker, graphics circuitry, a printer, a projector, etc. It should be appreciated that, in some embodiments, one or more of the peripheral devices 136 may function as both an input device and an output device (e.g., a touchscreen display, a digitizer on top of a display screen, etc.). It should be further appreciated that the types of peripheral devices 136 connected to the security signing server 102 may depend on, for example, the type and/or intended use of the security signing server 102. Additionally or alternatively, in some embodiments, the peripheral devices 136 may include one or more ports, such as a USB port, for example, for connecting external peripheral devices to the security signing server 102.

The VNF image management server 104 may be embodied as any type of compute device capable of generating, producing, and/or managing the VNF images 180 and performing the functions described herein. For example, the VNF image management server 104 may be embodied as a compute device, a server (e.g., stand-alone, rack-mounted, blade, etc.), a sled (e.g., a compute sled), a workstation, a desktop computer, a laptop computer, a notebook computer, a tablet computer, a mobile computing device, a wearable computing device, a network appliance (e.g., physical or virtual), a router, a web appliance, a distributed computing system, a processor-based system, a multiprocessor system, and/or other computational device. As such, the VNF image management server 104 includes various components similar to the security signing server 102, such as a compute engine, an I/O subsystem, a data storage, a communication subsystem, and various other devices. The description of those common components provided above in regard to the security signing server 102 are applicable to the corresponding components of the VNF image management server 104 and is not repeated herein for clarity of the description.

The NFV server 106 may be embodied as any type of compute device capable of deploying (e.g., spinning up and shutting down) the VNF images 180 to provide various network functions and services and performing the other functions described herein. For example, the NFV server 106 may be embodied as a compute device, a server (e.g., stand-alone, rack-mounted, blade, etc.), a sled (e.g., a compute sled), a workstation, a desktop computer, a laptop computer, a notebook computer, a tablet computer, a mobile computing device, a wearable computing device, a network appliance (e.g., physical or virtual), a router, a web appliance, a distributed computing system, a processor-based system, a multiprocessor system, and/or other computational device. As such, the NFV server 106 includes various components similar to the security signing server 102, such as a compute engine, an I/O subsystem, a security engine to perform various cryptographic functions (e.g., generating the hash of the VNF images 180), a data storage, a communication subsystem, and various other devices. The description of those common components provided above in regard to the security signing server 102 are applicable to the corresponding components of the NFV server 106 and is not repeated herein for clarity of the description.

The certificate authority server 108 may be embodied as any type of third-party compute device capable of attesting to the authenticity of various data, such as the private key associated with a VNF image 180, and performing the other functions described herein. For example, the certificate authority server 108 may be embodied as a compute device, a server (e.g., stand-alone, rack-mounted, blade, etc.), a sled (e.g., a compute sled), a workstation, a desktop computer, a laptop computer, a notebook computer, a tablet computer, a mobile computing device, a wearable computing device, a network appliance (e.g., physical or virtual), a router, a web appliance, a distributed computing system, a processor-based system, a multiprocessor system, and/or other computational device. As such, the certificate authority server 108 includes various components similar to the security signing server 102, such as a compute engine, an I/O subsystem, a data storage, a communication subsystem, and various other devices. The description of those common components provided above in regard to the security signing server 102 are applicable to the corresponding components of the certificate authority server 108 and is not repeated herein for clarity of the description.

As discussed above, each of the security signing server 102, the VNF image management server 104, the NFV server 106, and the certificate authority server 108 communicate with each other over the network 110. The network 110 may be embodied as any type of wired or wireless communication network, including but not limited to a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a LAN, a WAN, a global network (e.g., the Internet), or any combination thereof. It should be appreciated that, in such embodiments, the network 110 may serve as a centralized network and, in some embodiments, may be communicatively coupled to another network (e.g., the Internet). Accordingly, the network 110 may include a variety of other virtual and/or physical network computing devices (e.g., routers, switches, network hubs, servers, storage devices, compute devices, etc.), as needed to facilitate communication between devices of the system 100, which are not shown to preserve clarity of the description.

Figure 5:
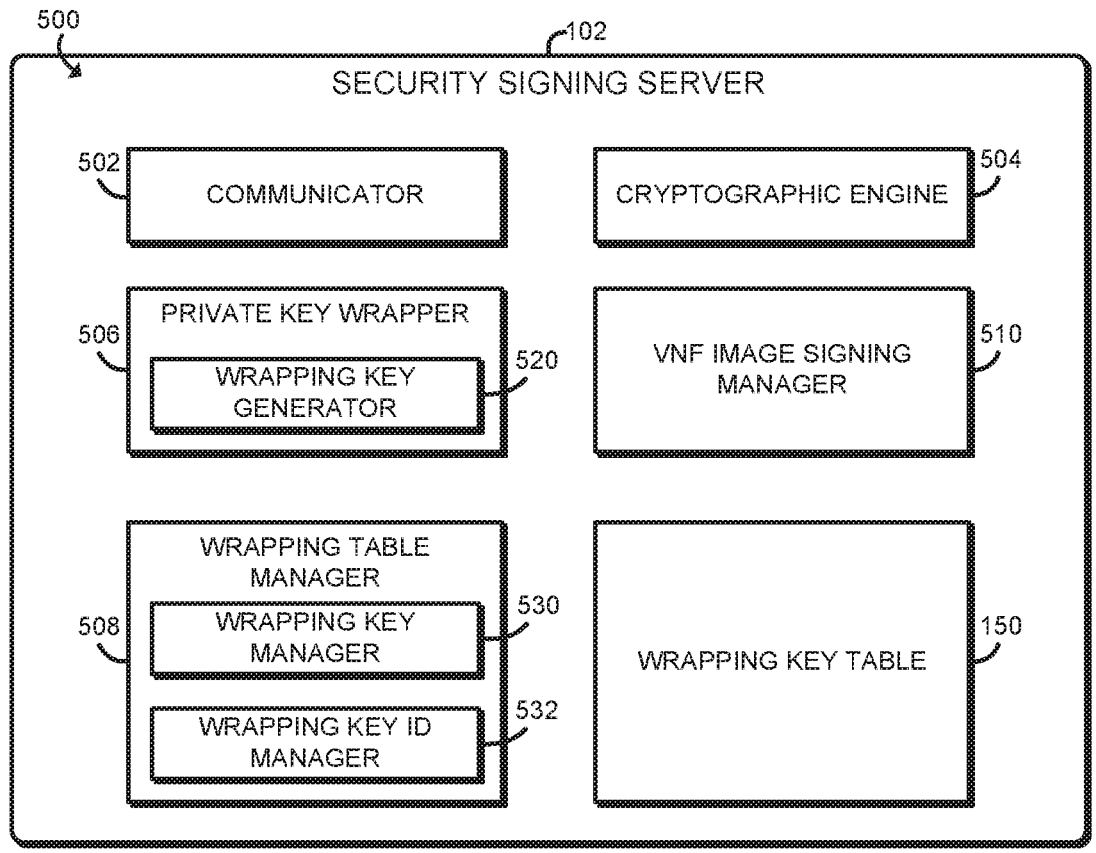
FIG. 5 is a simplified block diagram of at least one embodiment of an environment that may be established by the VNF server of the system of FIG. 1.

Referring now to FIG. 5, in use, the security signing server 102 establishes an environment 500 during operation. The illustrative environment 500 includes a communicator 502, a cryptographic engine 504, a private key wrapper 506, a VNF image signing manager 510, a wrapping table manager 508, and the wrapping key table 150. The various components of the environment 500 may be embodied as hardware, firmware, software, or a combination thereof. As such, in some embodiments, one or more of the components of the environment 500 may be embodied as circuitry or collection of electrical devices (e.g., communicator circuitry 502, cryptographic engine circuitry 504, private key wrapper circuitry 506, VNF image signing manager circuitry 510, wrapping table manager circuitry 508, etc.).

It should be appreciated that, in some embodiments, one or more of the illustrative components of the environment 500 may form a portion of another component and/or one or more of the illustrative components may be independent of one another. Further, in some embodiments, one or more of the components of the environment 500 may be embodied as virtualized hardware components or emulated architecture, which may be established and maintained by the compute engine 120 or other component(s) of the security signing server 102. Additionally, it should be appreciated that the security signing server 102 may include other components, sub-components, modules, sub-modules, logic, sub-logic, and/or devices commonly found in a compute device, which are not illustrated in FIG. 5 for clarity of the description.

The communicator 502, which may be embodied as hardware, firmware, software, virtualized hardware, emulated architecture, and/or a combination thereof as discussed above, is configured to receive inbound and route/transmit outbound network traffic. Accordingly, the communicator 502 manages and facilitates communications between the security signing server 102 and the other devices (i.e., the VNF image management server 104, the NFV server 106, and the certificate authority server 108) of the system 100 over the network 110.

The cryptographic engine 504, which may be embodied as hardware, firmware, software, virtualized hardware, emulated architecture, and/or a combination thereof as discussed above, is configured to provide cryptographic services to other components of the environment 500. For example, as discussed in more detail below, the cryptographic engine 504 may be requested or directed to generate wrapping keys as needed. To do so, the cryptographic engine may use any suitable methodology or technology to generate the wrapping keys. In some embodiments, for example, the cryptographic engine 504 randomly generates the wrapping keys using any suitable cryptographic key generation algorithm. The cryptographic engine 504 may also be requested or directed to wrap the private keys 184 with the generated wrapping keys to produce the wrapped private keys 194 as discussed above. Furthermore, during operation, the cryptographic engine 504 may be requested or directed to generate hashes of various data, such as the VNF image data 182 and/or the wrapped private key 194, and sign (e.g., encrypt) such hashes. To do so, the cryptographic engine may use any suitable cryptographic hash function and related technologies to generate and sign the hashes.

The private key wrapper 506, which may be embodied as hardware, firmware, software, virtualized hardware, emulated architecture, and/or a combination thereof as discussed above, is configured to manage the wrapping of the private keys 184 and the unwrapping of the wrapped private keys 194. To do so, the private key wrapper 506 includes a wrapping key generator 520, which communicates with the cryptographic engine 504, to generate a wrapping key as needed. As discussed above, the wrapping keys may be randomly generated in some embodiments. Once generated, the private key wrapper 506 may use the wrapping key to wrap the private key 184 to generate a corresponding wrapped private key 194. The private key wrapper 506, with the help of the cryptographic engine 504, may use any suitable cryptographic algorithm to wrap, encapsulate, or otherwise encrypt the private key 184 with the wrapping key. Similarly, the private key wrapper 506, with the help of the cryptographic engine 504, may use a corresponding cryptographic algorithm to unwrap, un-encapsulate, or otherwise decrypt the wrapped private key 194 to obtain the corresponding private key 184.

The wrapping table manager 508, which may be embodied as hardware, firmware, software, virtualized hardware, emulated architecture, and/or a combination thereof as discussed above, is configured to manage and access the wrapping key table 150. To do so, the wrapping table manager 508 includes a wrapping key manager 530 and a wrapping key ID manager 532. The wrapping key manager 530 is configured to store the wrapping keys generated by the private key wrapper 506 in the wrapping key table 150. The wrapping key ID manager 532, with cooperation of the cryptographic engine 504, is configured to generate a hash of the wrapped private key 194 produced by the private key wrapper 506. The wrapping key ID manager 532 stores the generated hash in the wrapping key table 150 in association with the wrapping key used to generate the wrapped private key 194. As discussed above, the hash of the wrapped private key 194 is used as an identifier for the corresponding wrapping key such that the wrapping table manager can retrieve the wrapping key associated with a wrapped private key 194 at a later time (e.g., to facilitate the unwrapping of the wrapped private key 194).

The VNF image signing manager 510, which may be embodied as hardware, firmware, software, virtualized hardware, emulated architecture, and/or a combination thereof as discussed above, is configured to managing the signing of new or updated versions of a VNF image 180 at the time of shutdown of the VNF image 180. As discussed above, a VNF image 180 may acquire additional content or context data during operation, which may modify the VNF image data 182 of the VNF image 180. As such, the VNF image signing manager 510 is configured, upon request, to sign the new version of the VNF image 180 during shutdown. To do so, the VNF image signing manager 510, with cooperation of the cryptographic engine 504, is configured to generate a hash of the VNF image data 182 of the new version of VNF image 180 and sign the generated hash using the private key 184 of the corresponding VNF image 180. As discussed above, the private key 184 of a VNF image 180 to be signed may be obtained by the VNF image signing manager 510 via cooperation of the private key wrapper 506 and the wrapping table manager 508. For example, the wrapping table manager 508 may generate a hash of a wrapped private key 194 of a VNF image 180 to be signed, obtain the corresponding wrapping key from the wrapping key table 150, and pass the wrapping key to the private key wrapper 506. The private key wrapper 506 may unwrap the wrapped private key 194 using the wrapping key and pass the unwrapped private key 184 to the VNF image signing manager 510 to facilitate the signing of the updated VNF image 180 using its private key 184.

Figure 6:
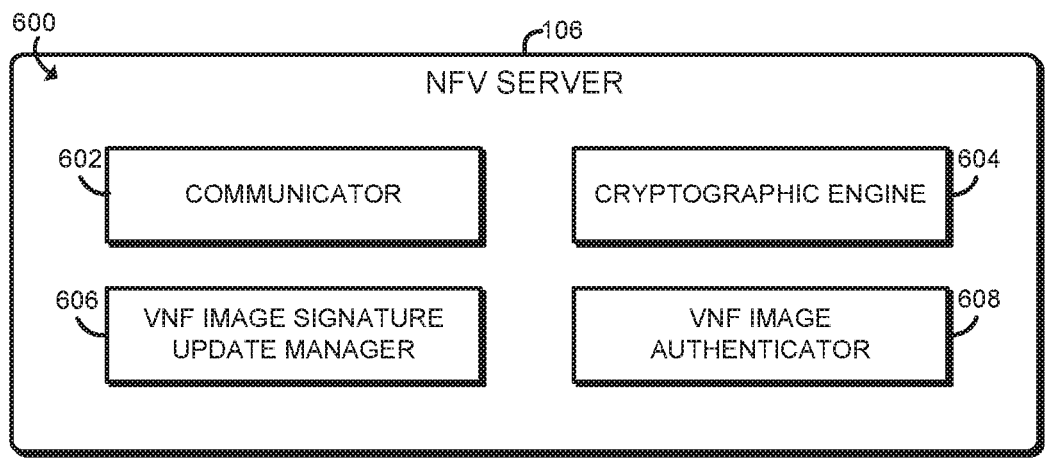
FIG. 6 is a simplified block diagram of at least one embodiment of an environment that may be established by a security signing server of the system of FIG. 1.

Referring now to FIG. 6, in use, the NFV server 106 establishes an environment 600 during operation. The illustrative environment 600 includes a communicator 602, a cryptographic engine 604, a VNF image signature update manager 606, and a VNF image authenticator 608. The various components of the environment 600 may be embodied as hardware, firmware, software, or a combination thereof. As such, in some embodiments, one or more of the components of the environment 600 may be embodied as circuitry or collection of electrical devices (e.g., communicator 602, cryptographic engine circuitry 604, VNF signature update manager circuitry 606, VNF image authenticator circuitry 608, etc.).

It should be appreciated that, in some embodiments, one or more of the illustrative components of the environment 600 may form a portion of another component and/or one or more of the illustrative components may be independent of one another. Further, in some embodiments, one or more of the components of the environment 600 may be embodied as virtualized hardware components or emulated architecture, which may be established and maintained by a compute engine or other component(s) of the NFV server 106. Additionally, it should be appreciated that the NFV server 106 may include other components, sub-components, modules, sub-modules, logic, sub-logic, and/or devices commonly found in a compute device, which are not illustrated in FIG. 6 for clarity of the description.

Similar to the communicator 502 of the security signing server 102, the communicator 602, which may be embodied as hardware, firmware, software, virtualized hardware, emulated architecture, and/or a combination thereof as discussed above, is configured to receive inbound and route/transmit outbound network traffic. Accordingly, the communicator 602 manages and facilitates communications between the NFV server 106 and the other devices (i.e., the security signing server 102, the VNF image management server 104, and the certificate authority server 108) of the system 100 over the network 110.

The cryptographic engine 604, which may be embodied as hardware, firmware, software, virtualized hardware, emulated architecture, and/or a combination thereof as discussed above, is configured to provide cryptographic services to other components of the environment 600 similar to the cryptographic engine 504 of the security signing server 102. For example, as discussed in more detail below, the cryptographic engine 604 may be requested or directed to generate hashes of various data, such as the VNF image data 182 of a VNF image 180. To do so, the cryptographic engine may use any suitable cryptographic hash function and related technologies to generate and sign the hashes.

The VNF image signature update manager 606, which may be embodied as hardware, firmware, software, virtualized hardware, emulated architecture, and/or a combination thereof as discussed above, is configured to request an updated signature 188 by the security signing server 102 of the VNF image 180 when the VNF image 180 is shutdown. As discussed above, a VNF image 180 may acquire additional content or context data during operation, which may modify the VNF image data 182 of the VNF image 180. As such, the VNF image signature update manager 606 may request the updated VNF image 180 be signed by the security signing server 102. To do so, as discussed in more detail below, the VNF image signature update manager 606 is configured to detect when a VNF image 180 is shutting down. If the VNF image signature update manager 606 determines that a VNF image 180 is shutting down, the VNF image signature update manager 606, in cooperation with the cryptographic engine 604, generates a hash of the updated version of the VNF image 180 and transmits the generated hash, along with the wrapped private key 194 of the VNF image 180, to the security signing server 102 for signing. Upon receiving an updated signature 188 back from security signing server 102, the VNF image signature update manager 606 replaces the signature 188 of the VNF image 180 with the updated signature 188.

The VNF image authenticator 608, which may be embodied as hardware, firmware, software, virtualized hardware, emulated architecture, and/or a combination thereof as discussed above, is configured to authenticate a VNF image 180 upon every spin-up or deployment of the VNF image 180. To do so, upon deployment, the VNF image authenticator 608, in cooperation with the cryptographic engine 604, generates a new hash of the VNF image 180 (i.e., the VNF image data 182) and compares that new hash to the previously generated hash of the VNF image 180. To obtain the previously generated hash, as discussed below, the VNF image authenticator 608 retrieves the public key from the certificate 186 and decrypts the signature 188 using the retrieved public key. If the new hash of the VNF image 180 matches the previously generated hash, the VNF image authenticator 608 determines that the VNF image 180 is authenticated and proceeds with the deployment process. If the new hash and previously generated hash do not match, the NFV server 106 does not deploy the VNF image 180 and may perform other security measures.

Figure 7:
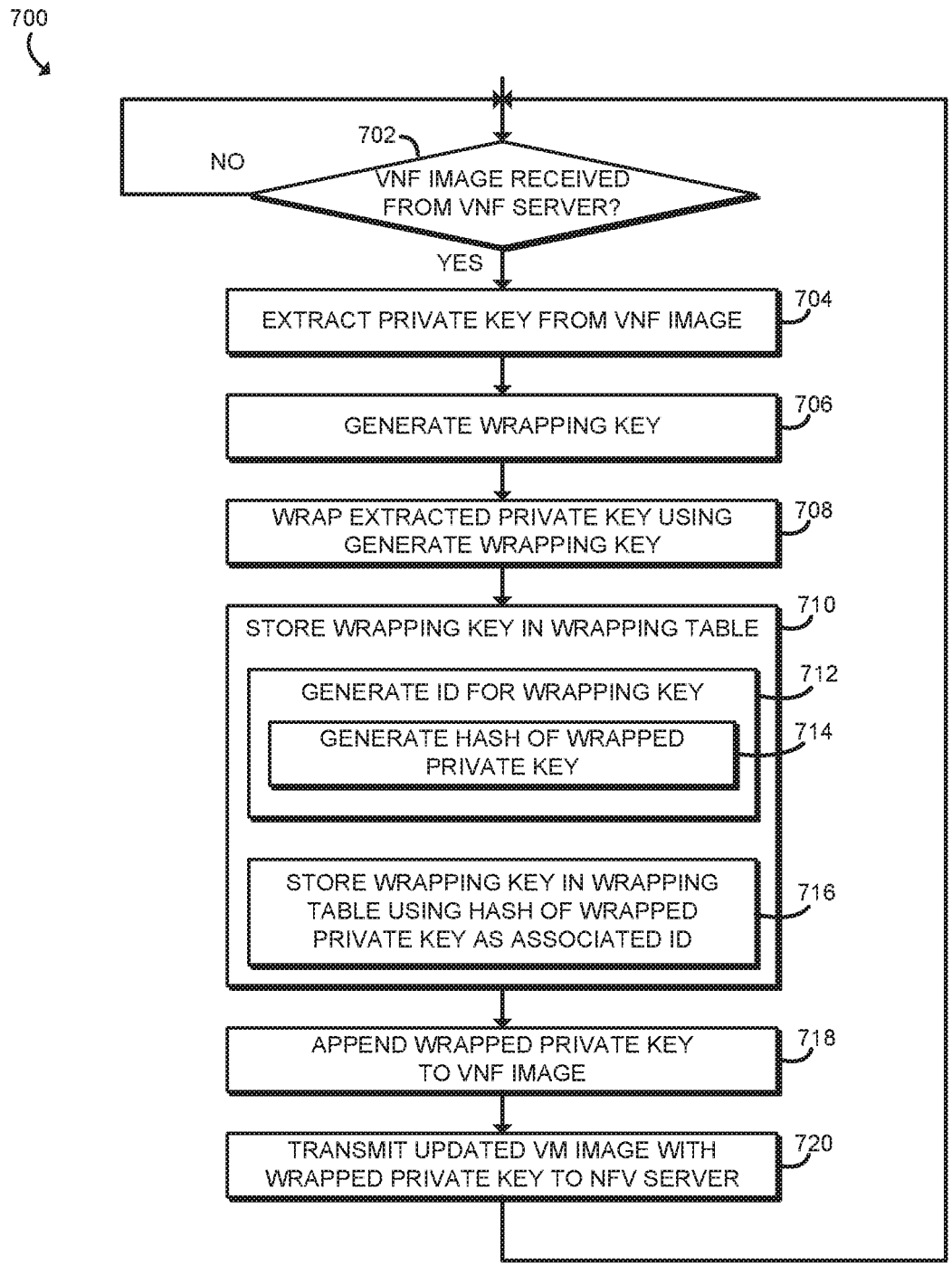
FIG. 7 is a simplified flow diagram of at least one embodiment of a method for establishing a root of trust for a VNF image that may be executed by the security signing server of FIGS. 1 and 6.

Referring now to FIG. 7, in use, the security signing server 102 may execute a method 700 for establishing a root of trust for a VNF image 180. The method 700 begins with block 702 in which the security signing server 102 monitors for receipt of a VNF image 180 to be secured from the VNF image management sever 104. If a VNF image 180 is received by the security signing server 102, the method 700 advances to block 704 in which the security signing server 102 extracts the private key 184 from the VNF image 180. Subsequently, in block 706, the security signing server 102 generates a wrapping key. To do so, as discussed above, the security signing server 102 may randomly generate a cryptographic key as the wrapping key in some embodiments. Additionally, the wrapping key may be unique to each VNF image 180. For example, aspects or data of the VNF image 180 may be used as a seed value for the randomly generated wrapping key. Regardless, in block 708, the security signing server 102 wraps the private key 184 with the wrapping key to generate the wrapped private key 194. To do so, the security signing server 102 may utilize any suitable cryptographic algorithm to generate the wrapped private key 194 using the wrapping key. F or example, the security signing server 102 may encrypt or encapsulate the private key 184 with the wrapping key in some embodiments.

In block 710, the security signing server 102 stores the wrapping key in the wrapping key table 150. To do so, in block 712, the security signing server 102 generates an identifier for the wrapping key. For example, in the illustrative embodiment, the security signing server 102 generates a hash of the wrapped private key 194 and uses the hash as the identifier for the corresponding wrapping key. As discussed above, the security signing server 102 may utilize any suitable cryptographic hashing function to generate the hash of the wrapped private key 194. Regardless, after the security signing server 102 has generated the hash of the wrapped private key 194, the security signing server 102 stores the wrapping key and the associated hash of the wrapped private key 194 in the wrapping key table 150 in block 716 by using the hash of the wrapped private key 194 as the associated identifier for the corresponding wrapping key.

In block 718, the security signing server 102 replaces appends the wrapped private key 194 to the VNF image 180. To do so, in the illustrative embodiment, the security signing server 102 replaces the unsecured private key 184 with the wrapped private key 194. Subsequently, in block 720, the security signing server 102 transmits the secured VNF image 180 to the NFV server 106 for deployment thereon. Additionally or alternatively, the security signing server 102 may transmit the secured VNF image 180 back to the VNF image management server 104 in block 720. Regardless, after the VNF image 180 has been secured, the method 700 loops back to block 702 in which the security signing server 102 awaits receipt of additional VNF images to be secured.

Figure 8:
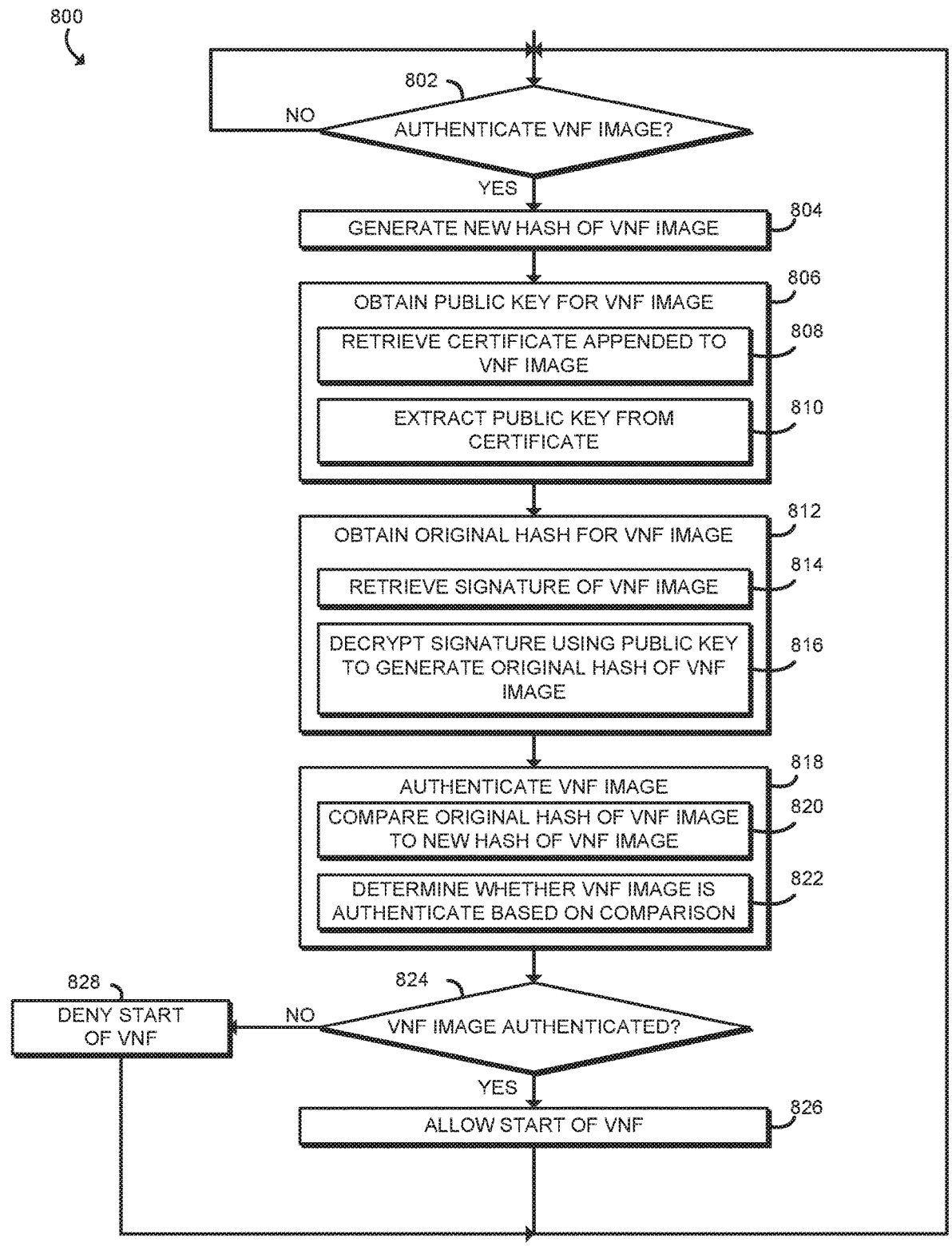
FIG. 8 is a simplified flow diagram of at least one embodiment of a method for authenticating a VNF image that may be executed by the VNF server of FIGS. 1 and 7.

Referring now to FIG. 8, in use, the NFV server 106 may execute a method 800 for authenticating a VNF image 180 prior to deployment or spin-up of that VNF image 180 on the NFV server 106. The method 800 begins with block 802 in which the NFV server 106 determines whether to authenticate the VNF image 180. If so, the method 800 advances to block 804 in which the NFV server 106 generates a new hash of the VNF image 180 to be deployed. To do so, as discussed above, the NFV server 106 may utilize any suitable cryptographic hashing function on the VNF image data 182 to generate the hash of the VNF image 180.

Subsequently, in block 806, the NFV server 106 obtains the public key of the VNF image 180. To do so, in block 808, the NFV server 106 retrieves the certificate 186 from the VNF image 180 and extracts the public key from the certificate 186 in block 810. As discussed above, the certificate 186 may be obtained from the certificate authority server 108 and authenticates the ownership of the public key.

In block 812, the NFV server 106 obtains or determines the original hash of the VNF image 180 (i.e., the original hash of the VNF image data 182). To do so, in block 814, the NFV server 106 retrieves the signature 188 of the VNF image 180 and decrypts, in block 816, the signature 188 using the public key obtained in block 806 to generate or otherwise produce the original hash. That is, as discussed above, the signature 188 is embodied as an encrypted hash of the VNF image 180 that may be decrypted using the public key of the VNF image 180.

Subsequently, in block 818, the NFV server 106 authenticates the present VNF image 180. To do so, in block 820, the NFV server 106 compares the new hash of the VNF image 180 generated in block 804 with the original hash of the VNF image 180 obtained in block 812. The NFV server 106 determines the authenticity of the VNF image 180 (i.e., the authenticity of the VNF image data 182) in block 822 based on the comparison performed in block 820. That is, if the new hash matches the original hash of the VNF image 180, the NFV server 106 determines that the VNF image 180 is authentic. However, if the new hash does not match the original hash of the VNF image 180, the NFV server 106 determines that the VNF image has been compromised or is otherwise not authentic.

In block 824, the NFV server 106 determines whether the VNF image 180 has been authenticated. If so, the method 800 advances to block 826 in which the NFV server 106 allows the start up or spin up of the VNF image 180 on the NFV server 106. For example, the NFV server 106 may start up the VNF image 180 in a new virtual machine 350. If, however, the NFV server 106 determines that the VNF image 180 has not been authenticated, the method 800 advances to block 828 in which the NFV server 106 denies the startup of the VNF image 180. Additionally, the NFV server 106 may perform additional or other security responses in block 828. Regardless, the method 800 may subsequently loop back to block 802 in which the NFV server 106 determines whether another VNF image 180 requires authentication.

Figure 9:
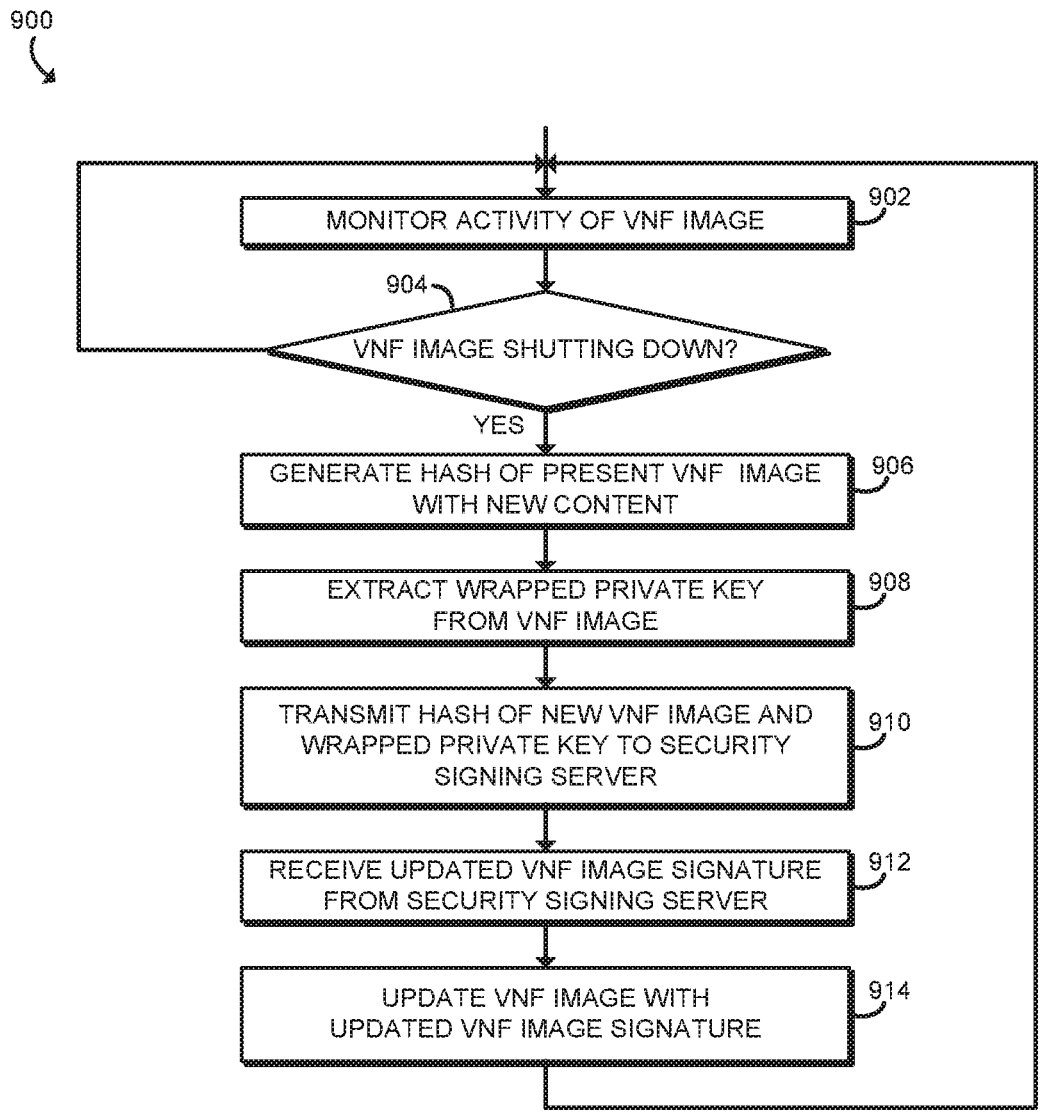
FIG. 9 is a simplified flow diagram of at least one embodiment of a method for obtaining an updated signature of a VNF image that may be executed by the VNF server of FIGS. 1 and 7.

Referring now to FIG. 9, in use, the NFV server 106 may execute a method 900 for obtaining an updated signature of a VNF image 180 upon shutdown of the VNF image 180. The method 900 begins with block 902 in which the NFV server 106 monitors the activity of a VNF image 180 executing on the NFV server 106. In particular, in block 904, the NFV server 106 determines whether the VNF image 180 is in the process of shutting down. If so, the method 900 advances to block 906 in which the NFV server 106 generates a hash of the present or updated VNF image 180 that is presently shutting down. As discussed above, the present VNF image 180 may be different from the VNF image 180 that was originally spun up due to additional content and/or context data generated during execution of the VNF image 180 on the NFV server 106. The NFV server 106 may utilize any suitable cryptographic hashing function on the VNF image data 182 of the VNF image 180 to generate the hash of the present VNF image 180.

Subsequently, in block 908, the NFV server 106 extracts the wrapped private key 194 of the present VNF image 180. In block 910, the NFV server 106 transmits the hash of the present/updated VNF image 180 and the wrapped private key 194 to the security signing server 102. As discussed in more detail below in regard to method 1000 of FIG. 10, the security signing server 102 cryptographically signs the hash of the updated VNF image 180 to generate an updated signature 188 and transmits the updated signature 188 back to the NFV server 106. As such, in block 912, the NFV server 106 receives the updated signature 188 from the security signing server 102 and updates the VNF image 180 with the updated signature 188 in block 914. For example, the NFV server 106 may swamp out the old signature 188 with the updated signature 188 received in block 912. The method 900 subsequently loops back to block 902 in which the NFV server 106 monitors the activity of other VNF images 180 executing on the NFV server 106.

Figure 10:
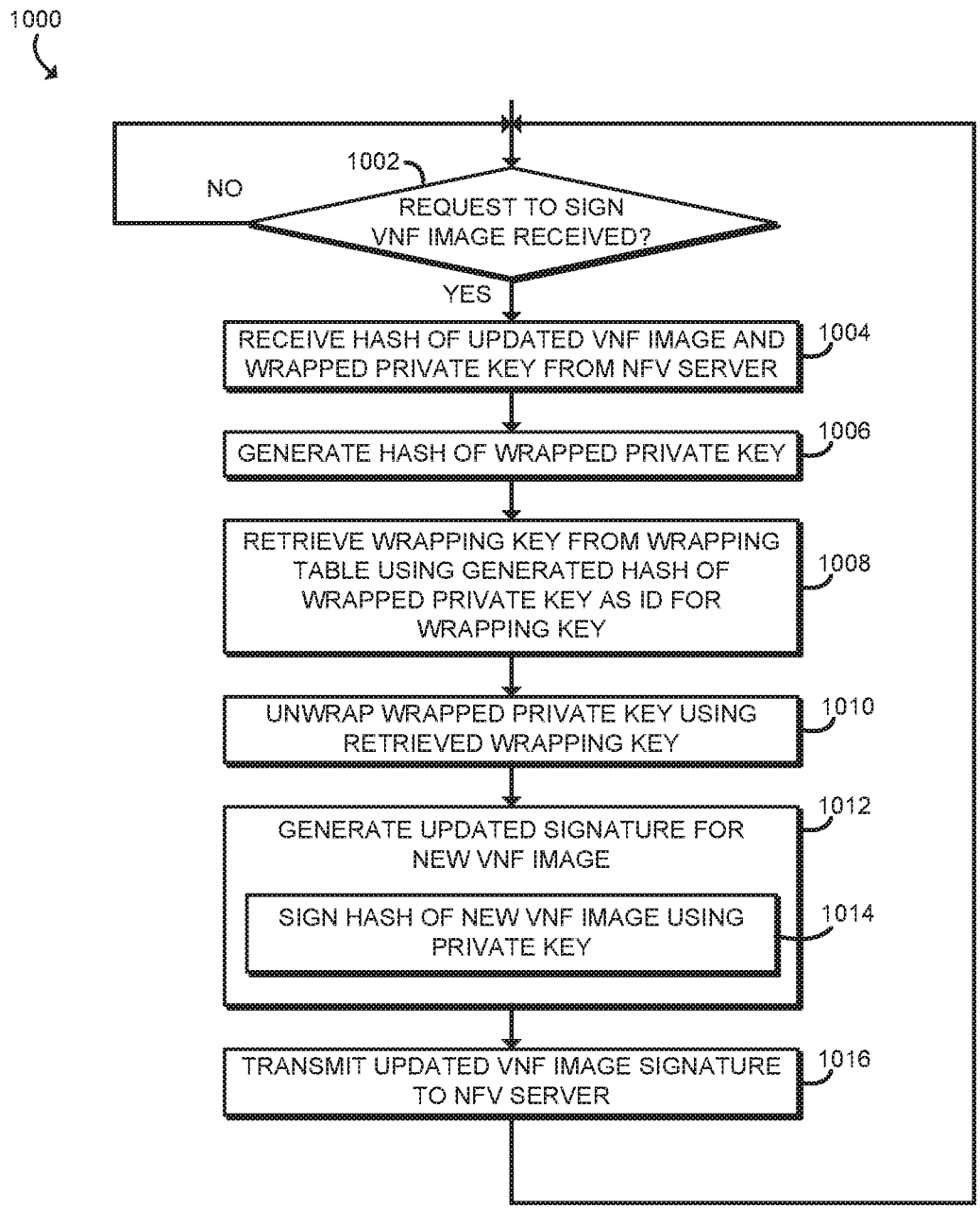
FIG. 10 is a simplified flow diagram of at least one embodiment of a method for updating a signature of a VNF image that may be executed by the security signing server of FIGS. 1 and 6.

Referring now to FIG. 10, in use, the security signing server 102 may execute a method 1000 for updating a signature of a VNF image 180. The method 1000 begins with block 1002 in which the security signing server 102 determines whether a request to sign a VNF image 180 has been received from the NFV server 106. If so, the method 1000 advances to block 1004 in which the security signing server 102 receives a hash of an updated VNF image 180 and a wrapped private key 194 of the updated VNF image 180 from the NFV server 106. As discussed above in regard to method 900 of FIG. 9, the NFV server 106 may generate the hash of the updated VNF image 180 and transmit the hash and the associated wrapped private key to the security signing server 102 to obtain an updated signature for the updated VNF image 180.

After the security signing server 102 receives the hash of the updated VNF image 180 and the wrapped private key 194 from the NFV server 106, the method 1000 advances to block 1006. In block 1006, the security signing server 102 generates a hash of the wrapped private key 194. To do so, the security signing server 102 utilizes the same cryptographic hashing function as used to generate the identifier of the wrapping key table 150 in block 714 of FIG. 7 described above. That is, by generating the hash of the wrapped private key 194 in block 1006, the security signing server 102 obtains an identifier to the wrapping key table 150. As such, in block 1008, the security signing server 102 retrieves the associated wrapping key from the wrapping key table 150 using the hash of the wrapped private key 194 generated in block 1006 as the identifier in the wrapping key table 150.

Subsequently, in block 1010, the security signing server 102 unwraps the wrapped private key 194 using the wrapping key retrieved in block 1008 to produce the private key 184. The security signing server 102 then generates an updated signature 188 for the VNF image 180 in block 1012. To do so, in block 1014, the security signing server 102 signs the hash of the updated or new VNF image 180, which was received in block 1004, with the private key 184 obtained in block 1010. As discussed above, the security signing server 102 may utilize any suitable cryptographic process and/or algorithm to sign the hash of the updated VNF image 180. In the illustrative embodiment, the security signing server 102 signs the hash by encrypting the hash of the updated VNF image 180 using the private key 184. That is, the signature 188 is embodied as the encrypted hash of the NFV image data 182. Regardless, in block 1016, the security signing server 102 transmits the updated signature 188 to the NFV server 106. The method 1000 subsequently loops back to block 1002 in which the security signing server 102 continues to monitor for additional requests to sign additional or other VNF image 180 from the NFV server 106. The security singing server 102 may perform multiple iterations of the method 1000 to update the signature of multiple VNF images 180.

EXAMPLES

Illustrative examples of the technologies disclosed herein are provided below. An embodiment of the technologies may include any one or more, and any combination of, the examples described below.

Example 1 includes a security server for securing a virtualization network function (VNF) image, the server comprising a communication circuit to receive a VNF image from a VNF image server, wherein the VNF image includes a private key; and a security engine to extract the private key from the VNF image; generate a wrapping cryptographic key; wrap the private key with wrapping cryptographic key to produce a wrapped private key; and replace the private key of the VNF image with the wrapped private key.

Example 2 includes the subject matter of Example 1, and wherein to generate the wrapping cryptographic key comprises to randomly generate the wrapping cryptographic key.

Example 3 includes the subject matter of any of Examples 1 and 2, and wherein to generate the wrapping cryptographic key comprises to generate a wrapping cryptographic key using a cryptographic engine of the security engine.

Example 4 includes the subject matter of any of Examples 1-3, and wherein the security engine comprises a trusted platform module.

Example 5 includes the subject matter of any of Examples 1-4, and wherein the security engine is further to store the wrapping cryptographic key in a wrapping cryptographic key table maintained by the security engine.

Example 6 includes the subject matter of any of Examples 1-5, and wherein the wrapping cryptographic key table is accessible only by the security engine.

Example 7 includes the subject matter of any of Examples 1-6, and wherein to store the wrapping cryptographic key in the wrapping cryptographic key table comprises to generate an identification value for the wrapping cryptographic key; and store the wrapping cryptographic key and the identification in the wrapping cryptographic key table in association with each other.

Example 8 includes the subject matter of any of Examples 1-7, and wherein to generate the identification value comprises to generate a cryptographic hash of the wrapped private key, and to store the identification in the wrapping cryptographic key table comprises to store the generated cryptographic hash of the wrapped private key in the wrapping cryptographic key table as an identification for the wrapping cryptographic key.

Example 9 includes the subject matter of any of Examples 1-8, and wherein the communication circuit is further to receive (i) a cryptographic hash of the VNF image that includes new content and (ii) the wrapped private key included in the VNF image from the network function virtualization (NFV) server, and wherein the security engine is further to generate a cryptographic hash of the received wrapped private key; retrieve the wrapping cryptographic key from the wrapping cryptographic key table based on the generated cryptographic hash of the received wrapped private key; unwrap the wrapped private key using the retrieved wrapping cryptographic key to obtain the private key; and generate an updated signature for the VNF image using the cryptographic hash of the received wrapped private key and the private key.

Example 10 includes the subject matter of any of Examples 1-9, and wherein to generate the updated signature for the VNF image comprises to sign the cryptographic hash of the received wrapped private key with the private key.

Example 11 includes the subject matter of any of Examples 1-10, and wherein the security engine is further to transmit, via the communication circuit, the updated signature to the NFV server.

Example 12 includes the subject matter of any of Examples 1-11, and wherein the communication circuit is further to receive (i) a cryptographic hash of another VNF image and (ii) another wrapped private key included in the another VNF image from a NFV server, and wherein the security engine is further to generate a cryptographic hash of the another wrapped private key; retrieve a wrapping cryptographic key from a wrapping cryptographic key table maintained by the security engine based on the generated cryptographic hash of the another wrapped private key; unwrap the another wrapped private key using the retrieved wrapping cryptographic key to obtain another private key; and generate a signature for the another VNF image using the cryptographic hash of the another wrapped private key and the another private key.

Example 13 includes the subject matter of any of Examples 1-12, and wherein to generate the signature for the another VNF image comprises to sign the cryptographic hash of the another wrapped private key with the another private key.

Example 14 includes the subject matter of any of Examples 1-13, and wherein the security engine is further to transmit, via the communication circuit, the signature to the NFV server.

Example 15 includes the subject matter of any of Examples 1-14, and wherein the security engine is further to transmit, via the communication circuit and subsequent to replacement of the private key of the VNF image with the wrapped private key, the VNF image to the NFV server for deployment thereon.

Example 16 includes a network function virtualization (NFV) server for securing a VNF image, the NFV server comprising a communication circuit; and a compute engine to execute a hypervisor to deploy the VNF image, wherein the VNF image includes a wrapped private key and a signature, wherein the hypervisor is to detect whether the VNF image is shutting down; generate, in response to a determination that the VNF image is shutting down, a cryptographic hash of the VNF image including new content relative to content of the VNF image at the time of deployment; retrieve the wrapped private key from the VNF image; transmit, via the communication circuit, the cryptographic hash of the VNF image including the new content and the wrapped private key to a security server; receive, via the communication circuit, an updated signature from the security server; and replace the signature of the VNF image with the updated signature.

Example 17 includes the subject matter of Example 16, and wherein the hypervisor is further to determine whether to authenticate the VNF image subsequent to deployment of the VNF image; generate, in response to a determination to authenticate the VNF image, a first cryptographic hash of the VNF image; obtain a public key of the VNF image; decrypt the signature of the VNF image using the public key to obtain a second hash of the VNF image that was previously generated; compare the first cryptographic hash and the second cryptographic hash; and authenticate the VNF image based on the comparison of first cryptographic hash and the second cryptographic hash.

Example 18 includes the subject matter of any of Examples 16 and 17, and wherein to obtain the public key comprises to retrieve a cryptographic certificate included in the VNF image; and extract the public key from the cryptographic certificate.

Example 19 includes the subject matter of any of Examples 16-18, and wherein to authenticate the VNF image comprises to authenticate the VNF image in response to a determination that the first cryptographic hash and the second cryptographic hash match.

Example 20 includes the subject matter of any of Examples 16-19, and wherein to authenticate the VNF image comprises to allow the start of the VNF image on the NFV server in response to a determination that the first cryptographic hash and the second cryptographic hash match.

Example 21 includes the subject matter of any of Examples 16-20, and wherein to authenticate the VNF image comprises to deny the start of the VNF image on the NFV server in response to a determination that the first cryptographic hash and the second cryptographic hash match.

Example 22 includes a method for securing a virtualization network function (VNF) image, the method comprising receiving, by a communication circuit of a security server, a VNF image from a VNF image server, wherein the VNF image includes a private key; extracting, by a security engine of the security server, the private key from the VNF image; generating, by the security engine, a wrapping cryptographic key; wrapping, by the security engine, the private key with wrapping cryptographic key to produce a wrapped private key; and replacing, by the security engine, the private key of the VNF image with the wrapped private key.

Example 23 includes the subject matter of Example 22, and wherein generating the wrapping cryptographic key comprises randomly generating the wrapping cryptographic key.

Example 24 includes the subject matter of any of Examples 22 and 23, and wherein to generating the wrapping cryptographic key comprises generating a wrapping cryptographic key using a cryptographic engine of the security engine.

Example 25 includes the subject matter of any of Examples 22-24, and wherein the security engine comprises a trusted platform module.

Example 26 includes the subject matter of any of Examples 22-25, and further including storing the wrapping cryptographic key in a wrapping cryptographic key table maintained by the security engine.

Example 27 includes the subject matter of any of Examples 22-26, and wherein the wrapping cryptographic key table is accessible only by the security engine.

Example 28 includes the subject matter of any of Examples 22-27, and wherein storing the wrapping cryptographic key in the wrapping cryptographic key table comprises generating an identification value for the wrapping cryptographic key; and storing the wrapping cryptographic key and the identification in the wrapping cryptographic key table in association with each other.

Example 29 includes the subject matter of any of Examples 22-28, and wherein generating the identification value comprises generating a cryptographic hash of the wrapped private key, and storing the identification in the wrapping cryptographic key table comprises storing the generated cryptographic hash of the wrapped private key in the wrapping cryptographic key table as an identification for the wrapping cryptographic key.

Example 30 includes the subject matter of any of Examples 22-29, and further including receiving, by the communication circuit, (i) a cryptographic hash of the VNF image that includes new content and (ii) the wrapped private key included in the VNF image from the network function virtualization (NFV) server; generating, by the security engine, a cryptographic hash of the received wrapped private key; retrieving, by the security engine, the wrapping cryptographic key from the wrapping cryptographic key table based on the generated cryptographic hash of the received wrapped private key; unwrapping, by the security engine, the wrapped private key using the retrieved wrapping cryptographic key to obtain the private key; and generating, by the security engine, an updated signature for the VNF image using the cryptographic hash of the received wrapped private key and the private key.

Example 31 includes the subject matter of any of Examples 22-30, and wherein generating the updated signature for the VNF image comprises signing the cryptographic hash of the received wrapped private key with the private key.

Example 32 includes the subject matter of any of Examples 22-31, and further including transmitting the communication circuit, the updated signature to the NFV server.

Example 33 includes the subject matter of any of Examples 22-32, and further including receiving, by the communication circuit, (i) a cryptographic hash of another VNF image and (ii) another wrapped private key included in the anther VNF image from a NFV server; generating, by the security engine, a cryptographic hash of the another wrapped private key; retrieving, by the security engine, a wrapping cryptographic key from a wrapping cryptographic key table maintained by the security engine based on the generated cryptographic hash of the another wrapped private key; unwrapping, by the security engine, the another wrapped private key using the retrieved wrapping cryptographic key to obtain another private key; and generating, by the security engine, a signature for the another VNF image using the cryptographic hash of the another wrapped private key and the another private key.

Example 34 includes the subject matter of any of Examples 22-33, and wherein generating the signature for the another VNF image comprises signing the cryptographic hash of the another wrapped private key with the another private key.

Example 35 includes the subject matter of any of Examples 22-34, and further including transmitting the signature to the NFV server.

Example 36 includes the subject matter of any of Examples 22-35, and further including transmitting, subsequent to replacement of the private key of the VNF image with the wrapped private key, the VNF image to the NFV server for deployment thereon.

Example 37 includes a method for securing a VNF image, the method comprising executing, by a NFV server, a hypervisor to deploy the VNF image, wherein the VNF image includes a wrapped private key and a signature, detecting, the hypervisor, whether the VNF image is shutting down; generating, by the hypervisor and in response to a determination that the VNF image is shutting down, a cryptographic hash of the VNF image including new content relative to content of the VNF image at the time of deployment; retrieving, by the hypervisor, the wrapped private key from the VNF image; transmitting, by the hypervisor, the cryptographic hash of the VNF image including the new content and the wrapped private key to a security server; receiving, by the hypervisor, an updated signature from the security server; and replacing, by the hypervisor, the signature of the VNF image with the updated signature.

Example 38 includes the subject matter of Example 37, and further including determining, by the hypervisor, whether to authenticate the VNF image subsequent to deployment of the VNF image; generating, by the hypervisor and in response to a determination to authenticate the VNF image, a first cryptographic hash of the VNF image; obtaining, by the hypervisor, a public key of the VNF image; decrypting, by the hypervisor, the signature of the VNF image using the public key to obtain a second hash of the VNF image that was previously generated; comparing, by the hypervisor, the first cryptographic hash and the second cryptographic hash; and authenticating, by the hypervisor, the VNF image based on the comparison of first cryptographic hash and the second cryptographic hash.

Example 39 includes the subject matter of any of Examples 37 and 38, obtaining the public key comprises retrieving, by the hypervisor, a cryptographic certificate included in the VNF image; and extracting, by the hypervisor, the public key from the cryptographic certificate.

Example 40 includes the subject matter of any of Examples 37-39, and wherein authenticating the VNF image comprises authenticating the VNF image in response to a determination that the first cryptographic hash and the second cryptographic hash match.

Example 41 includes the subject matter of any of Examples 37-40, and wherein authenticating the VNF image comprises allowing the start of the VNF image on the NFV server in response to a determination that the first cryptographic hash and the second cryptographic hash match.

Example 42 includes the subject matter of any of Examples 37-41, and wherein authenticating the VNF image comprises denying the start of the VNF image on the NFV server in response to a determination that the first cryptographic hash and the second cryptographic hash match.

Example 43 includes one or more machine-readable storage media comprising a plurality of instructions stored thereon that, when executed, causes a server to perform the method of any of Examples 22-42.

Example 44 includes a server comprising means for performing the method of any of Examples 22-42.

The invention claimed is:

1. A network function virtualization (NFV) server for securing a VNF image, the NFV server comprising:
   a communication circuit to communicate with a security server; and
   a compute engine to execute a hypervisor to deploy the VNF image, wherein the VNF image includes a wrapped private key and a signature,
   wherein the hypervisor is to:
      detect whether the VNF image is shutting down;
      generate, in response to a determination that the VNF image is shutting down, a cryptographic hash of the VNF image including new content relative to content of the VNF image at the time of deployment;
      retrieve the wrapped private key from the VNF image;
      transmit, via the communication circuit, the cryptographic hash of the VNF image including the new content and the wrapped private key to the security server;
      receive, via the communication circuit, an updated signature from the security server;
      replace the signature in the VNF image with the updated signature;
      determine whether to authenticate the VNF image subsequent to deployment of the VNF image;
      generate, in response to a determination to authenticate the VNF image, a first cryptographic hash of the VNF image;
      obtain a public key of the VNF image;
      decrypt the signature of the VNF image using the public key to obtain a second cryptographic hash of the VNF image that was previously generated;
      compare the first cryptographic hash and the second cryptographic hash; and
      authenticate the VNF image based on comparison of first cryptographic hash and the second cryptographic hash.

2. The NFV server of claim 1, wherein to obtain the public key comprises to:
   retrieve a cryptographic certificate included in the VNF image; and
   extract the public key from the cryptographic certificate.

3. The NFV server of claim 1, wherein to authenticate the VNF image comprises to authenticate the VNF image in response to v that the first cryptographic hash and the second cryptographic hash match.

4. The NFV server of claim 1, wherein to authenticate the VNF image comprises to allow the start of the VNF image on the NFV server in response to a determination that the first cryptographic hash and the second cryptographic hash match.

5. The NFV server of claim 1, wherein to authenticate the VNF image comprises to deny the start of the VNF image on the NFV server in response to a determination that the first cryptographic hash and the second cryptographic hash match.

6. One or more non-transitory machine-readable storage media comprising a plurality of instructions stored thereon that, when executed, causes a network function virtualization (NFV) server to:
   execute a hypervisor to deploy a VNF image, wherein the VNF image includes a wrapped private key and a signature,
   detect whether the VNF image is shutting down;
   generate, in response to a determination that the VNF image is shutting down, a cryptographic hash of the VNF image including new content relative to content of the VNF image at the time of deployment;
   retrieve the wrapped private key from the VNF image;
   transmit the cryptographic hash of the VNF image including the new content and the wrapped private key to a security server;
   receive an updated signature from the security server;
   replace the signature in the VNF image with the updated signature;
   determine whether to authenticate the VNF image subsequent to deployment of the VNF image;
   generate, in response to a determination to authenticate the VNF image, a first cryptographic hash of the VNF image;
   obtain a public key of the VNF image;
   decrypt the signature of the VNF image using the public key to obtain a second cryptographic hash of the VNF image that was previously generated;
   compare the first cryptographic hash and the second cryptographic hash; and
   authenticate the VNF image based on comparison of the first cryptographic hash and the second cryptographic hash.

7. The one or more non-transitory machine-readable storage media of claim 6, wherein to obtain the public key comprises to:
   retrieve a cryptographic certificate included in the VNF image; and
   extract the public key from the cryptographic certificate.

8. The one or more non-transitory machine-readable storage media of claim 6, wherein to authenticate the VNF image comprises to authenticate the VNF image in response to a determination that the first cryptographic hash and the second cryptographic hash match.

9. The one or more non-transitory machine-readable storage media of claim 6, wherein to authenticate the VNF image comprises to allow the start of the VNF image on the NFV server in response to a determination that the first cryptographic hash and the second cryptographic hash match.

10. The one or more non-transitory machine-readable storage media of claim 6, wherein to authenticate the VNF image comprises to deny the start of the VNF image on the NFV server in response to a determination that the first cryptographic hash and the second cryptographic hash match.

\* \* \* \* \*